Patented Apr. 29, 1930

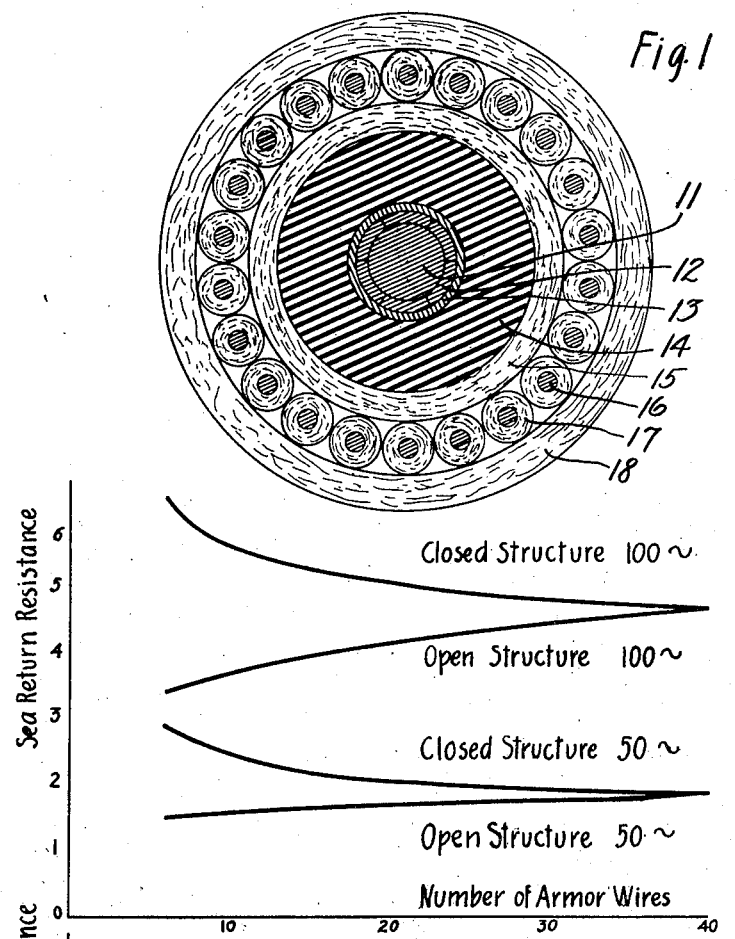

1,756,546

UNITED STATES PATENT OFFICE

JOHN J. GILBERT, OF PORT WASHINGTON, NEW YORK, ASSIGNOR TO WESTERN ELECTRIC COMPANY, INCORPORATED, OF NEW YORK, N. Y., A CORPORATION OF NEW YORK

SUBMARINE CABLE

Application filed December 12, 1923. Serial No. 680,170.

This invention relates to submarine cables and more particularly to cables over which signals are transmitted involving a range of frequencies from zero to several hundred cycles per second.

An object of this invention is to diminish the sea return resistance of submarine cables, particularly for the range of frequencies just mentioned.

Another object of the invention is to provide a submarine cable armor which will facilitate the transmission of signals on the cable. A further object is to provide a cable system, including cable and terminal apparatus, which is especially well adapted for transmission of signals involving the frequency range from 0 to several hundred cycles per second.

In accordance with one feature of the invention, armor wires are employed which are of higher resistivity than those heretofore used. In accordance with another feature of the invention, a cable is employed having high resistance armor wires which are spaced from one another to decrease the return circuit resistance by diminishing the screening effect of the armor wires, the spacing being such as to be advantageous with the particular resistivity of armor wire material chosen.

It is the practice in submarine cable telegraphy to employ a grounded system, in which the armor and the sea water and earth surrounding the cable are made a part of the cable circuit. It is well-known that even where very low frequencies are involved, the return current will not be distributed uniformly throughout the earth and sea water, but will show a tendency to concentrate in the vicinity of the cable core. The result of this concentration is to introduce into the cable circuit an effect known as "the sea return resistance".

This invention in one of its principal aspects is based upon the discovery that for certain frequency ranges (depending somewhat upon the size and general design of the cable) the armor wires which always more or less screen from the sea water the electromagnetic field which would give rise to return current in the sea water and consequently confine to themselves more or less of this current, are of higher resistance than the conducting sea water even with its restricted cross section, and that the return current resistance can be reduced by employing cables for the transmission of these frequencies in which the armor wires are constructed as hereinafter described. For cables of the size and general construction of the present day long ocean cables, this frequency range is from 0 to several hundred cycles per second.

It has already been found of advantage, so far as a much higher range of frequencies is concerned, to furnish a cable with a copper sheath made of tape wound spirally around the core so as to form a conductor concentric with the core. But it is found that this method is not practical for the lower frequency range just mentioned, for, unless the resistance of the sheath alone is comparable in magnitude with the sea water resistance without the copper sheath, the sea return resistance will be increased by the addition of the copper sheath. This is because the screening action is such as to confine to the sheath the greater part of the return current. In the range of frequencies from zero to 100 cycles per second with cables such as are now in use for transoceanic operation, this condition would require such a large amount of copper in the sheath that the cost and weight of the cable would be increased beyond practical limits. It is proposed, in accordance with the present invention, to decrease the sea return resistance for the signaling range employing frequencies from zero to one hundred cycles per second, and in some instances, much higher frequencies by improved design of the armoring system, particular attention being devoted to its electrical characteristics as part of the conducting system without ignoring its principal function of furnishing mechanical strength and protection to the cable.

In the frequency range from zero to several hundred cycles, the greatest improvement in the electrical design of the armor wires is obtained by providing that the screening action shall be as small as possible, so that a large part of the return current shall be carried by the sea water, which is more efficient for this purpose than any metallic conductor which is practicable for long ocean cables. The invention, however, is not limited in use to long cables, the frequency range under consideration being applicable to both long and short cables. It will be apparent that the upper limit of the frequency range in which the invention is applicable will depend somewhat upon the dimensions of the elements of the cable and particularly upon the mean diameter of the armor sheath. The screening action in accordance with this invention may be diminished, first, by using an open structure for the armor wires so that there is an interval between adjacent wires and second, by employing a material for the armor wires which has higher resistivity than those heretofore used.

Referring to the drawing, from which the invention will be better understood, and which illustrates one embodiment of the invention by way of example, Fig. 1 is a cross-sectional view of a submarine cable utilizing the invention; Figs. 2 and 3 are curves showing values of sea return resistance as affected by the mechanical structure and resistivity of the armor wires; and Fig. 4 is a diagrammatic showing of the cable of Fig. 1 and terminal transmitting apparatus T and receiving apparatus R associated therewith.

As shown in Fig. 1, and also in part in Fig. 4, the central conductor consists of a central strand 11 surrounded by a plurality of strands 12 of such shape as to give the composite conductor a smooth cylindrical surface. Upon this is laid a spiral wrapping 13 of magnetic material of high permeability, which in turn is surrounded by a layer 14 of gutta-percha or rubber in the usual manner. Upon this insulation is laid a usual layer 15 of jute yarn which forms a bedding for the armor wires 16 which are spaced from one another and held in position by surrounding layers 17 of jute or tape of suitable material and of the necessary thickness to give the desired spacing. There is preferably applied outside the armor wires wrappings 18 of tarred jute yarn or a heavy black burlap fabric known as hessian band, in accordance with the usual practice. Several bands or layers of armor wires may be used if desired, and as is frequently done, one layer within another. The arrangement would then preferably be such as to produce the least screening of the field in the sea water. The armor wires 16 are of a material having higher resistivity than ordinary steel (which has heretofore been generally used and which has a resistivity somewhat less than seventeen microhms per centimeter cube and also having high tensile strength. Suitable materials are nickel steel, chromium steel and Krupp steel. Resistance to chemical action is also of some moment.

Fig. 2 is a pair of curves for 50 cycles and 100 cycles, respectively, showing the relation between sea return resistance and the number of armor wires used in a submarine cable of a given core diameter with different arrangements of armor wires. In all cases the diameter of the individual wires is chosen so as to satisfy the mechanical requirement, number $\times$ (diameter)$^2$ = constant. Two arrangements of the armor wires were employed in obtaining these data; a "closed structure" in which the mean diameter of the armor sheath was reduced until adjacent wires were in contact and an "open structure" in which the mean diameter of the sheath, no matter what the number of wires, was constant but sufficiently large to allow an interval between adjacent wires. In this arrangement the wires come in contact in the case where 40 wires are employed. The curves show that considerable reduction in sea return resistance can be obtained by separation of the armor wires, and in any cable designed to transmit frequencies between 25 cycles and 100 cycles, this separation should be increased to the limit imposed by mechanical considerations.

The curves of Fig. 3 shows how the sea return resistance, for given dimensions of the core and armor wires, depends upon the electrical resistivity of the material used in the wires. The values of resistivity for various materials including the variety of steel now used in armor wires are indicated on the curves, and it can be seen that by employing armor of high resistivity the sea return resistance can be considerably reduced. In particular, the use of hard steel, nickel steel, or chromium steel is of great advantage. An additional consideration is that, since the tensile strength of these steels is higher than that of ordinary steel, a smaller cross-section of armor would satisfy the mechanical requirements and, therefore, the armor resistance would be increased with resultant further decrease in the sea return resistance. In Fig. 3 the curve for 100 cycles indicates that as the resistivity of the armor is decreased below 10 microhms per centimeter cube, the sea return resistance decreases, due to the fact that the armor then has a resistance less than that of the sea alone. The advantage gained by using materials having resistivity in this neighborhood may be, and usually is, nullified by the high cost and poor mechanical characteristics of such materials. However, soft steel (or alloys) may become relatively inexpensive, and, in special cases, the necessity for mechanical strength may be absent. There would then be an advantage in using such materials. This constitutes another aspect of my invention which forms the subject matter of a separate application.

Any suitable terminal apparatus may be employed as part of a cable system involving this invention, examples being those shown in British Patent 153,357 and U. S. Patent to Allison A. Clokey, No. 1,601,941, Oct. 5, 1926.

A mathematical treatise involving certain principles underlying this invention is contained in a paper by John R. Carson and John J. Gilbert, published in the Bell System Technical Journal, July 1922, the title being Transmission characteristics of the submarine cable.

What is claimed is:

1. A submarine signaling cable comprising a signaling conductor or conductors, armor wires spaced therefrom and composed of material having a resistivity of twenty microhms per centimeter cube or more.

2. A submarine cable comprising a central conductor or conductors, a plurality of armor wires around said conductor or conductors and insulation between said armor wires and said conductor or conductors, said wires being spaced from each other and being composed of material having a resistivity of twenty microhms per centimeter cube or more.

3. A submarine cable for operation with frequency components up to a limiting frequency of several hundred cycles per second, comprising a conductive core, insulating material around said core and armor wires around said insulating material and approximately parallel to the core, said armor wires being of material of resistivity of at least 20 microhm cms. and higher tensile strength than ordinary steel and spaced from each other such a distance that further spacing would exceed the limit of mechanical safety but would further reduce the return circuit resistance for frequency components below said limiting value.

4. In a submarine telegraph cable system a cable comprising a core having centrally disposed conducting means surrounded by insulation, and armor wires around said core composed of a material having a resistivity of 20 microhms per centimeter cube or more, in combination with means for signaling by transmitting over said cable, and receiving a range of frequencies such that the return circuit impedance is less than it would be at those frequencies if the resistivity of the armor wires were reduced.

In witness whereof, I hereunto subscribe my name this 3rd day of December A. D., 1923.

JOHN J. GILBERT.